Patented Nov. 10, 1925.

1,561,042

UNITED STATES PATENT OFFICE.

RICHARD C. WILLIAMS, OF BALTIMORE, MARYLAND.

PROCESS FOR RECOVERING DIATOMACEOUS EARTH FROM WASTE MATERIAL.

No Drawing.    Application filed July 15, 1925. Serial No. 43,871.

*To all whom it may concern:*

Be it known that I, RICHARD C. WILLIAMS, a citizen of the United States, residing at Baltimore city, State of Maryland, have invented certain new and useful Improvements in Processes for Recovering Diatomaceous Earth from Waste Material, of which the following is a specification.

This invention relates to the use of waste material from sugar refineries and the like.

The invention has special reference to the employment of the waste diatomaceous earth, commonly known as "mud-cake" derived from the filters of sugar refineries, dye-works and the like, in the manufacture of fired plastic articles such as brick, tile, heat and sound insulations and other similar articles.

Diatomaceous earth is used extensively in the refining of sugar and other materials which contain particles of impurities, in either a colloidal state or in a dissolved state but still larger than the minute pores in the diatoms themselves or the spaces in between the diatoms. These impurities are caught mechanically when the sugar or other solution is strained through cakes of diatomaceous earth formed on the leaves of a filter press.

This earth is usually cleaned and the broken particles or the diatoms separated from the whole diatoms, the latter alone being preferably used in filtration.

The impurities usually found in a raw sugar solution consist of very minute particles of cane, very small pieces of jute from the bags but principally carbon compounds other than sugars, which so far as I can learn, have neither been analyzed nor their precise nature determined, if indeed in the present state of our knowledge of organic chemistry, they can be. They are collectively called waxes, gums, resins, tars, etc. Fortunately, it is unnecessary to classify these substances into their various classes for the purposes of this discussion as all of them have common physical properties, viz.:

First. They are sticky, hence surround the diatoms and fill up the pores not only in the diatoms but, in connection with water which must be added to form plastic articles, spaces in between the diatoms, completely. This protects the whole diatoms from fracture in the necessary machine operations prior to the manufacture of plastic articles.

Second. They are all carbonaceous and are completely burned out when the kindling temperature is reached in the kiln, in the presence of a sufficient amount of oxygen, leaving no ash. This decreases the amount of fuel necessary to raise the mass to a sintering temperature.

Third. They are all subject to the attacks of vegetable micro-organisms, such as bacteria, yeasts, fungi, etc. Some of them are attacked vigorously by the common micro-organisms more especially by members of the fungus family. The mud-cake (as the waste from the sugar is called) begins to ferment almost immediately it comes from the filters even at low temperatures and the cakes are white with fungus growth over night. It is to be noted that the condition of the mud-cake is not the most favorable for the propagation of the various types of micro-organisms for in the first place there is insufficient water and in the second place the temperature is low, particularly in the winter time. However the opposite is the case when the attempt is made to form plastic articles from it, for it is usually necessary to add water for molding the article and the temperature in the commercial dryer, which ranges from 125–140 degrees F. is ideal for the propagation of these organisms. There is therefore a violent fermentation with the formation of alcohol, acetic acid, and other liquid products but more especially the formation of gases, chiefly carbon dioxide, which, because of the dense and impervious nature of the molded bricks and other articles, cannot readily escape. A pressure is thereby formed which disrupts the unburnt bricks and other articles almost completely. Accordingly it is necessary, to make any articles successfully out of this material, to stop this action entirely or at least to slow up the action so that gas will not be formed faster than it can escape. This latter can be accomplished by adding water with or without the application of heat and allowing the first violent fermentation to take place before the article is formed. This will leave behind those substances not readily attacked by the common organisms. Then not enough gas is formed to create a pressure sufficient to crack the articles while they are drying.

However the better plan is to add to the mud-cake or other corbonaceous waste some fungicide, germicide, etc. as for example the salts of copper, the phenols, creosote or like material, so that the fermentation is completely prevented by the destruction of the micro-organic plants. A very small percentage only is necessary in that those of an in-organic nature are in such small quantities that they exercise no deleterious effects whereas the organic materials are completely burned out in the kilns.

The principal object of the present invention is, therefore, to provide a novel and important method of preparing waste diatomaceous earth from filters and the like for use in plastic articles by preventing disruptive fermentation in the molded articles.

A second object of the invention is to so treat the mud-cake as to effectively destroy the ferments therein and the spores of such ferments as they collect on the cake during handling thereby preventing disruptive fermentation in the molded articles.

With the above and other objects in view, as will be hereinafter apparent, the invention consists in general of a novel and improved process for preparing molded articles from diatomaceous mud-cake which will now be particularly described and then specifically claimed.

In the accomplishment of the foregoing objects I may use either of two specific methods or may combine the two, the three processes thus available being generically alike.

In the first of these methods I take the mud-cake as it comes from the filter and mix the same, preferably in a suitable mill, with such quantity of water as is necessary to enable the desired articles to be molded, thus quantity being variable in accordance with the dryness of the mud-cake and the specific articles to be manufactured. The mixed material is now allowed to stand and if preferred, may be subjected to a mild heat to encourage a rapid development of fermentation. Upon the first violent fermentation ceasing the material may again be mixed to free the gases from the mass. It is now molded, subjected to the usual drying process and finally burnt in a suitable kiln. Under this method the slight secondary or residual fermentation which takes place after molding produces so little gas that it has not disruptive effect on the molded articles and these articles emerge from the kiln without being cracked or broken by the fermentative effects whereas, is molded in the usual way as soon as mixed with water, only a very small percentage of usuable articles are made, the loss through cracking and breaking running as high, in some instances, as 95%.

In the second method the same procedure is adopted except that there is added during the mixing or to the mixing water a suitable fungicide or germicide such as a salt of copper, a phenol, creosote or the like, a very small percentage of such material being emplyed.

In the combined method the ferment preventive may be added after the violent fermentation takes place, thus stopping further fermentation in the molded articles.

Thus, each of these methods effects the elimination of disruptive fermentation in the molded articles.

Having thus described the invention, what is claimed as new is:

1. That step in the process of preparing plastic material for molding from mud-cake which consists in treating the mud-cake before molding to prevent disruptive fermentation in the molded article.

2. Those steps in the process of preparing molded articles from mud-cake which consists in mixing the mud cake with water, and treating the mixture to eliminate disruptive fermentation in the molded articles.

3. That step in the process of preparing molded articles from mud-cake which consists in mixing the mud-cake with a solution of a ferment preventive in water.

In testimony whereof I affix my signature.

RICHARD C. WILLIAMS.